United States Patent
Naseer-Ul-Islam et al.

(10) Patent No.: US 11,843,980 B2
(45) Date of Patent: Dec. 12, 2023

(54) SHORT STAY HANDOVER WITH SLICE-UNAVAILABILITY

(71) Applicant: NOKIA TECHNOLOGIES OY, Espoo (FI)

(72) Inventors: Muhammad Naseer-Ul-Islam, Munich (DE); Ingo Viering, Munich (DE); Håkon Helmers, Sceaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 311 days.

(21) Appl. No.: 17/264,658

(22) PCT Filed: Aug. 1, 2018

(86) PCT No.: PCT/EP2018/070813
§ 371 (c)(1),
(2) Date: Jan. 29, 2021

(87) PCT Pub. No.: WO2020/025121
PCT Pub. Date: Feb. 6, 2020

(65) Prior Publication Data
US 2021/0337437 A1    Oct. 28, 2021

(51) Int. Cl.
*H04W 4/00* (2018.01)
*H04W 36/00* (2009.01)
*H04W 36/08* (2009.01)
*H04W 36/18* (2009.01)
*H04W 92/20* (2009.01)

(52) U.S. Cl.
CPC ... *H04W 36/0055* (2013.01); *H04W 36/0088* (2013.01); *H04W 36/008375* (2023.05); *H04W 36/08* (2013.01); *H04W 36/18* (2013.01); *H04W 92/20* (2013.01)

(58) Field of Classification Search
CPC ......... H04W 36/0055; H04W 36/0088; H04W 36/08; H04W 36/18; H04W 36/245; H04W 92/20
USPC .......................................... 370/331; 455/312
See application file for complete search history.

(56) References Cited

U.S. PATENT DOCUMENTS

| | | |
|---|---|---|
| 2012/0039305 A1 | 2/2012 | Han et al. |
| 2013/0208661 A1* | 8/2013 | Nylander .............. H04W 48/18 370/328 |

(Continued)

FOREIGN PATENT DOCUMENTS

WO    WO 2018/128076 A1    7/2018

OTHER PUBLICATIONS

International Search Report and Written Opinion dated Nov. 7, 2018 corresponding to International Patent Application No. PCT/EP2018/070813.

(Continued)

*Primary Examiner* — Marcos Batista
(74) *Attorney, Agent, or Firm* — SQUIRE PATTON BOGGS (US) LLP

(57) ABSTRACT

An apparatus and a method are described by which, upon preparing a handover of a terminal device in a source cell, mobility information and at least one connected slice network slice identifier identifying at least one network slice used by the terminal device is added to a terminal device history of the terminal device, and the terminal device history is sent to a target cell for the handover.

13 Claims, 4 Drawing Sheets

(56) References Cited

U.S. PATENT DOCUMENTS

2013/0322409 A1 12/2013 Takahashi et al.
2018/0324645 A1* 11/2018 Park .................. H04W 36/0055

OTHER PUBLICATIONS

Huawei, "(TP for NR BL CR for TS 38.423) NG-RAN UE History Information introduction," 3GPP Draft; R3-183782, 3GPP TSG-RAN WG3 Meeting Ad Hoc, Montreal, Canada, Jul. 2-6, 2018, Jul. 1, 2018, XP051468066.
Huawei, "New cause value in HO procedures for slicing," 3GPP Draft; R3-182449, 3GPP TSG-RAN3 Meeting #99-bis, Sanya, China, Apr. 16-Apr. 20, 2018, Apr. 25, 2018, XP051449223.
First Examination Report dated Jan. 17, 2022 corresponding to Indian Patent Application No. 202147007712.

* cited by examiner

SHORT STAY HANDOVER WITH SLICE-UNAVAILABILITY

FIELD OF THE INVENTION

The present invention relates to an apparatus, a method and a computer program product by which a short stay handover with slice-unavailability can be handled.

RELATED BACKGROUND ART

The following meanings for the abbreviations used in this specification apply:
eICIC Enhanced Inter-Cell Interference Coordination
eNB evolved Node B
eMBB Enhanced Mobile Broadband
HO Handover
IE Information Element
MRO Mobility Robustness Optimization
NM Network Manager
RAT Radio Access Technology
RLF Radio Link Failure
SON Self-Organizing Network
S-NSSAI Single Network Slice Selection Assisted Information
UE User Equipment
URLLC Ultra-Reliable Low Latency Communication Embodiments of the present invention, although not limited to this, relate to Handover (HO) optimization in network deployments with network slicing.

Network slicing is a key 5G feature to support different services using the same underlying mobile network infrastructure [3GPP TS 23.501]. Network slices can differ either in their service requirements like URLLC and eMBB or the tenant that provides those services. From network management perspective, different network slices can also have different optimization goals. For example, for URLLC service any kind of HO failures would be critical and should be avoid as much as possible. However, for eMBB service, HO failures would be relatively less critical and optimization focus would be to minimize the service interruption (e.g. by accelerating the failure recovery) rather than to avoid the HO failures at all costs. Additionally, network slices can also be supported only in a limited area within the mobile network operator's full coverage area e.g. a network slice to support an enterprise or factory specific services.

From UE's perspective, it can simultaneously connect to multiple slices, maximum up to eight slices but it can subscribe to even more slices.

Mobility Robustness Optimization (MRO) is a SON feature to optimize the HO performance [3GPP TS 36.300]. The main aim of MRO is to minimize HO related problems that result into connection failures like Too Early HOs, Too Late HOs and HOs to Wrong Cell.

SON for UE group was introduced in Release 11 to allow different MRO behavior for different groups of UEs within the same cell. UE group specific optimization may be needed e.g. based on UE speed, UE capability (e.g. eICIC-capable versus-non-capable) and now potentially also based on the network slices the UE is connected to due to slice specific mobility requirements. This was achieved by introducing the Mobility Information IE (bit string) in the HO signaling. The eNBs are free to choose any type of UE categorization and apply according Mobility Information tags. The source cell signals this Mobility Information IE as part of the HO preparation signaling and then the target cell reports back the same if it observes any problems during or shortly after the HO (via HO Report). The source cell can then recall any UE group specific configurations applied for that UE and can try to re-configure its parameters accordingly (separately for each category as defined by its own).

SUMMARY OF THE INVENTION

Embodiments of the present invention aim to provide handling of short stay handovers with slice-unavailability.

According to a first aspect, an apparatus is provided which comprises at least one processor and at least one memory including computer program code, the at least one memory and the computer program code configured to, with the at least one processor, cause the apparatus at least to perform: preparing a handover of a terminal device in a source cell, adding mobility information and at least one connected slice network slice identifier identifying at least one network slice used by the terminal device to a terminal device history of the terminal device during the handover preparation, and sending the terminal device history to a target cell for the handover of the terminal device.

According to a second aspect, a method is provided which comprises:
preparing a handover of a terminal device in a source cell,
adding mobility information and at least one connected slice network slice identifier identifying at least one network slice used by the terminal device to a terminal device history of the terminal device during the handover preparation, and
sending the terminal device history to a target cell for the handover of the terminal device.

The first and second aspects may be modified as follows:
The apparatus, e.g., the source cell, may receive a report on a short stay handover with slice unavailability from a target cell involved in the handover of the terminal device, the short stay handover being a handover from the source cell to a final target cell via at least one first target cell which does not support at least one network slice used by the terminal device, and may modify mobility parameters based on the received report in order avoid a short stay handover with an interruption of the network slice.

The apparatus, e.g., the source cell, may request the first target cell and/or the final target cell to provide measurements of the terminal device.

The apparatus, e.g., the source cell, may request the first target cell to instruct the terminal device to measure and report the source cell to the first target cell for a limited period of time.

The apparatus, e.g., the source cell, may provide a list of additional cells to be measured and reported by the terminal device. Moreover, optionally the list of additional neighboring cells may be chosen depending on slices supported by the neighboring cells as well as their measurements as reported by the terminal device to the original source cell.

Furthermore, specific threshold values to compare the terminal device measurements may be provided and the target cell may be instructed to send the terminal device measurements only if the terminal device measurements for the source cell or the other neighboring cells cross those thresholds.

A time period during which the terminal device should make the measurements and report to the target cell may be specified.

The report may be sent to a network control element.

According to a third aspect, an apparatus is provided which comprises at least one processor and at least one memory including computer program code, the at least one memory and the computer program code configured to, with the at least one processor, cause the apparatus at least to perform: receiving a terminal device history from a source cell of a handover of a terminal device, the terminal device history including mobility information and at least one connected slice network slice identifier identifying at least one network slice used by the terminal device of the terminal device, detecting whether a short stay handover with slice unavailability has occurred, the short stay handover with slice unavailability being a handover from a source cell to a final target cell via at least one first target cell which does not support at least one network slice used by the terminal device, and, when short stay handover with slice unavailability has occurred, extracting the terminal device history of the terminal device and reporting the short stay handover to the source cell.

According to a fourth aspect, a method is provided which comprises:
receiving a terminal device history from a source cell of a handover of a terminal device, the terminal device history including mobility information and at least one connected slice network slice identifier identifying at least one network slice used by the terminal device of the terminal device,
detecting whether a short stay handover with slice unavailability has occurred, the short stay handover with slice unavailability being a handover from a source cell to a final target cell via at least one first target cell which does not support at least one network slice used by the terminal device, and,
when short stay handover with slice unavailability has occurred, extracting the terminal device history of the terminal device and reporting the short stay handover to the source cell.

The third and fourth aspects may be modified as follows:
The extracted terminal device history may be included into the report.

The extracted terminal device history may includes mobility information, a list of connected single network slice selection assisted information and/or cell coverage quality measurements.

Information from measurements received from the terminal device may be included into the report.

The information from measurements received from the terminal device may be included into the report only when certain conditions are fulfilled.

The report may be sent to a network control element.

According to a fifth aspect, an apparatus is provided which comprises at least one processor and at least one memory including computer program code, the at least one memory and the computer program code configured to, with the at least one processor, cause the apparatus at least to perform: receiving a report on a short stay handover with slice unavailability including a terminal device history from a cell involved in a short stay handover with slice unavailability of the terminal device, wherein the short stay handover with slice unavailability is a handover from a source cell to a final target cell via at least one first target cell which does not support at least one network slice used by the terminal device, and the terminal device history includes mobility information and at least one connected slice network slice identifier identifying at least one network slice used by the terminal device, and adjusting mobility parameters of the source cell according to the received terminal device history.

According to a sixth aspect, a method is provided which comprises:
receiving a report on a short stay handover with slice unavailability including a terminal device history from a cell involved in a short stay handover with slice unavailability of the terminal device, wherein the short stay handover with slice unavailability is a handover from a source cell to a final target cell via at least one first target cell which does not support at least one network slice used by the terminal device, and the terminal device history includes mobility information and at least one connected slice network slice identifier identifying at least one network slice used by the terminal device, and
adjusting mobility parameters of the source cell according to the received terminal device history.

According to a modification of the fifth and the sixth aspect, additionally coverage of any of the involved cells may be optimized.

According to an seventh aspect of the present invention a computer program product is provided which comprises code means for performing a method according to any one of the second, fourth, sixth and eighth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to an eighth aspect an apparatus is provided which comprises means for preparing a handover of a terminal device in a source cell, means for adding mobility information and at least one connected slice network slice identifier identifying at least one network slice used by the terminal device to a terminal device history of the terminal device during the handover preparation, and means for sending the terminal device history to a target cell for the handover of the terminal device.

According to a ninth aspect an apparatus is provided which comprises means for receiving a terminal device history from a source cell of a handover of a terminal device, the terminal device history including mobility information and at least one connected slice network slice identifier identifying at least one network slice used by the terminal device of the terminal device, means for detecting whether a short stay handover with slice unavailability has occurred, the short stay handover with slice unavailability being a handover from a source cell to a final target cell via at least one first target cell which does not support at least one network slice used by the terminal device, and, means for, when short stay handover with slice unavailability has occurred, extracting the terminal device history of the terminal device and reporting the short stay handover to the source cell.

According to a tenth aspect an apparatus is provided which comprises means for receiving a report on a short stay handover with slice unavailability including a terminal device history from a cell involved in a short stay handover with slice unavailability of the terminal device, wherein the short stay handover with slice unavailability is a handover from a source cell to a final target cell via at least one first target cell which does not support at least one network slice used by the terminal device, and the terminal device history includes mobility information and at least one connected slice network slice identifier identifying at least one network slice used by the terminal device, and means for adjusting mobility parameters of the source cell according to the received terminal device history.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before describing embodiments in detail, the problem underlying the present application is described in some more detail.

As mentioned above, the main aim of MRO is to minimize HO related problems that result into connection failures. However, there are also other mobility related problems like ping-pong HOs and short stay HOs but they have not been actively pursued in the MRO standardization (they are simpler to detect for the network since the UE context is still properly transferred from cell to cell). Although, these kinds of HOs generate some extra signaling and compromise the UE's data performance during those extra HOs but as they don't result into any connection failures so they are currently not part of 3GPP specification for MRO. An overload condition of a base station such as an ENB may result to signaling failures and possibly service outage of the base station.

The problem is described in the following by referring to FIG. 1, which shows a short-stay handover. In this example, three cells are involved, namely Cell 1, Cell 2 and Cell 3. It is assumed that Cell 1 and Cell 3 both support slices A, B and C, whereas Cell 2 only supports slice A.

Figure 1:
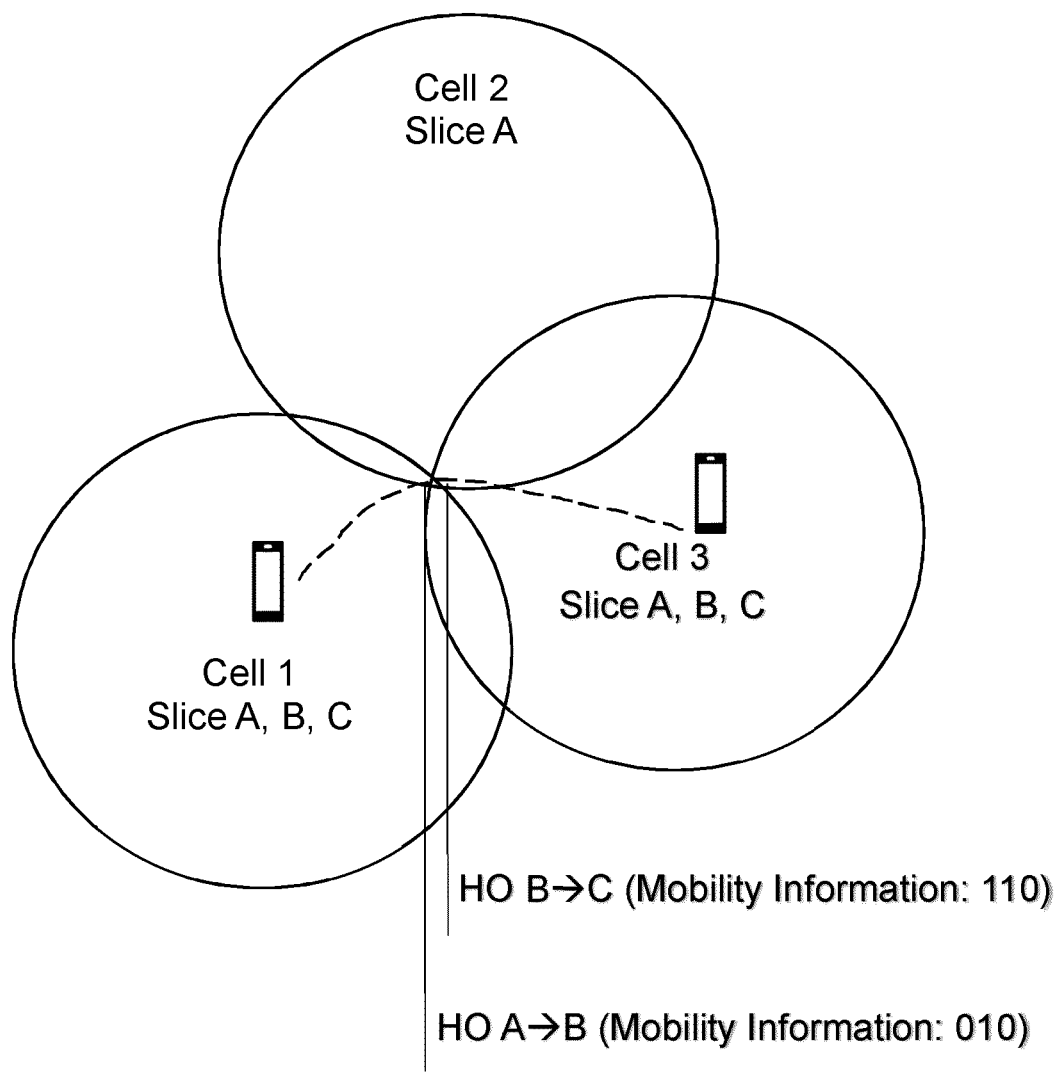
FIG. 1 shows a scenario of a short stay handover with slice unavailability between three cells according an embodiment.

In case of a "short stay HO" (or "rapid HO") as shown in FIG. 1, a UE performs a successful HO from Cell 1 to Cell 2, then after a short interval performs a HO from Cell 2 to Cell 3. Whereas ping-pongs (successful handovers 1-2-1) are probably considered in many MRO implementations, short stays 1-2-3 are typically not considered to create serious problems to the network and are therefore not counted as MRO problems.

As eNBs are free to choose their own Mobility Information IE to categorize UEs in their coverage area (otherwise 3GPP would have needed to exactly specify the categorization), based on their own interpretation of the UE types and their mobility requirements, it is highly unlikely that both Cell 1 and Cell 2 use the same Mobility Information IE in their respective HO preparation messages. This would especially be true for multi-vendor neighboring cells. Even in scenarios with neighboring cells from the same vendor with same logic for Mobility Information IE allocation, two neighbors can potentially apply different Mobility Information IE for the same UE, for example, if the two cells support different slices with different mobility requirements. In the example below, Cell 2 supports only a subset of slices (only slice A) that are supported by Cell 1 (slices A, B and C) and being used by the UE before the HO from Cell 1 to Cell 2. Therefore, Cell 1 applies Mobility Information IE based on the mobility requirements of all the connected slices in Cell 1, whereas, Cell 2 applies Mobility Information based on the requirements of only a subset of slices that it can support for the UE.

In the above scenario, although both HOs were successful but the UE still experienced a service interruption for a subset of slices it was connected to (e.g. slice B and C) in Cell 1 when it performed the HO from Cell 1 to Cell 2. Only after the second HO to Cell 3, the UE could restore service to all the slices. In deployments where the UE stays in Cell 2 for very short interval or when the difference between signal strengths of Cell 2 and Cell 3 is very small when Cell 1 decided the first HO, it would be beneficial for full service continuity that Cell 1 performs the HO directly to Cell 3. To overcome this service interruption, Cell 3 can detect this short stay in Cell 2, for example by using the UE History information, and can inform Cell 1 to modify its mobility parameters. But Cell 3 does not know the Mobility Information IE that was applied by Cell 1 and can only report the Mobility Information IE provided by Cell 2. Therefore, it would not be possible for Cell 1 to recall what UE specific optimization it performed for that UE. Note, that the short stay in Cell 2 itself can be read from UE history as explained in the following section.

When network slicing is not considered, the pain created by such a short stay is moderate i.e. no HO failures but only some extra signaling and there have not been many attempts to fix this problem. But considering a potential service interruption as explained above, this problem is definitely worth to be fixed.

The main problems are:
The problem can be fixed only by Cell 1 (it should postpone the handover to cell 2 and/or "pre-pone" the handover to Cell 3)
None of the cells has a full picture of the occurring problem. Maximum knowledge is available at Cell 3 which knows short dwell time in Cell 2, and no slice-service in Cell 2 but in Cell 3. Still, it doesn't know whether the UE was connected to the slices in Cell 1 that are missing in Cell 2 or not.

Embodiments of the present invention aim to overcome this problem by allowing the cells to combine their knowledge and bring it to Cell 1 in order to fix the problem.

MRO has been a part of 3GPP specification since Release-8 and several features have been specified for generic MRO and the UE Group specific MRO. Useful 3GPP features [3GPP TS 36.423] in connection to some embodiments are:

UE history: This can be used to analyze UE's mobility pattern in terms of what cells the UE visited before coming into the current serving cell as well as how much time it spent in each of those cells. Before handing over the UE to the target cell, each serving cell appends the UE history information with its own details like the cell ID and time spent by the UE in its coverage area and forwards this information to the target cell as part of the HO preparation.

Mobility Information: This can be used to perform UE group specific MRO as explained above.

Unnecessary HO to another RAT: This feature can be used to detect unnecessary HO to another RAT in multi-RAT deployments. The source cell can request the target cell to let the UE measure and report the source cell for a short period and report back if the source cell measurement by the UE are above a certain threshold. The source cell can then use these reports to modify its inter-RAT mobility parameters [3GPP TS 36.300]. If the source cell is a high-capacity cell, then it may for instance decide to keep UEs longer before doing the inter-RAT handover.

HO report: This is used to report any mobility related problems that the target cell observes during or shortly after the HO. The report contains the type of HO failure observed as well as the Mobility Information provided by the source cell along with some other related information to help the source cell re-configure its mobility parameters.

Some embodiments of the present application propose measures for proper detection of "short stay HO with slice un-availability" and the means to communicate the detected problem to the original source cell for its rectification by re-configuration of the network parameters, as will be described in the following.

In the following, a general overview of some embodiments is described by referring to FIGS. 2 to 6.

Figure 2:
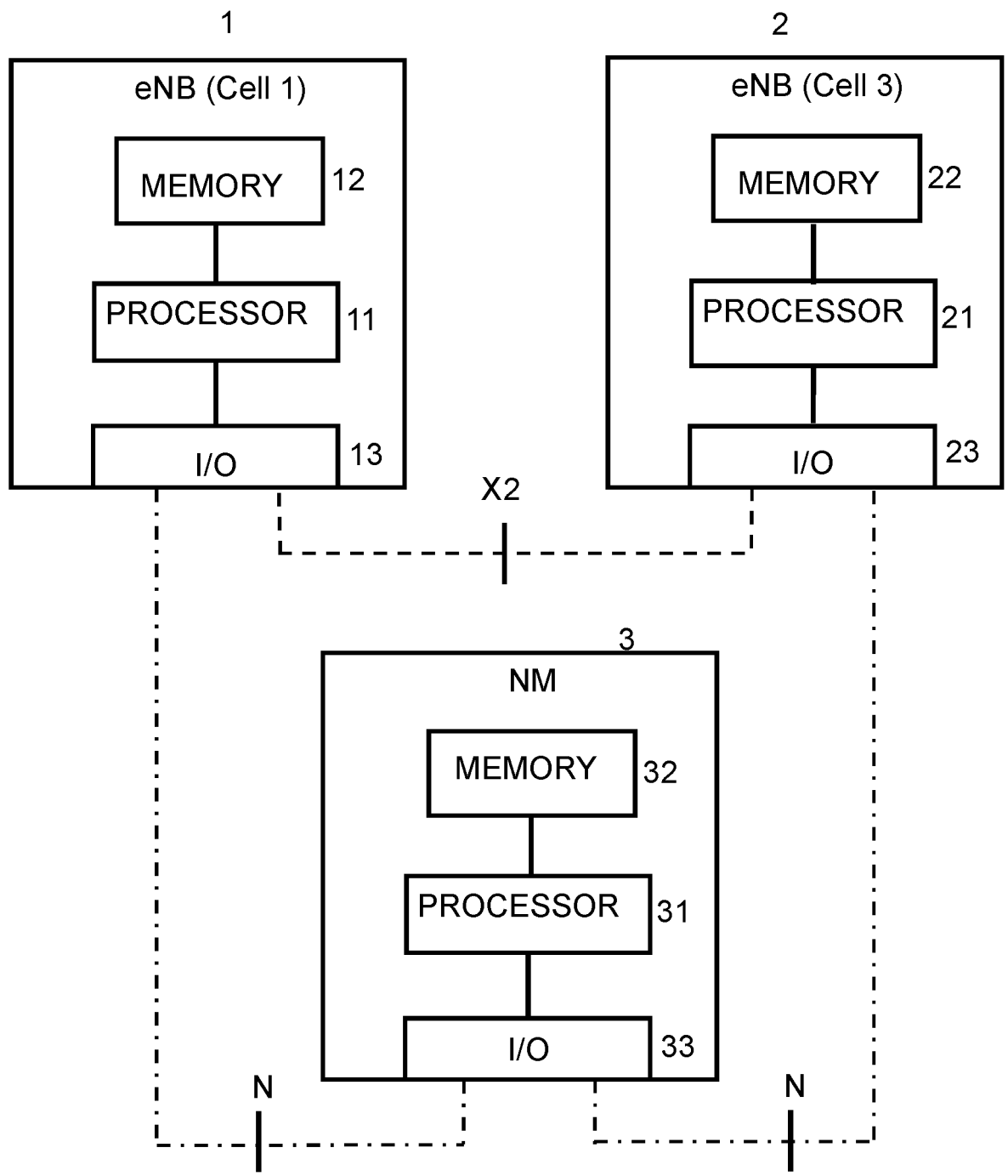
FIG. 2 shows eNBs and a network manager (NM) according to an embodiment.

In particular, FIG. 2 shows an eNB 1 as an example for a first apparatus according to the present embodiment. However, the invention is not limited to an ENB, but can be any kind of base station, which provides a radio connection to a terminal device such as a user equipment. Moreover, the first apparatus may also be a part of the eNB only. The eNB 1 may serve Cell 1 shown in FIG. 1, for example. Furthermore, FIG. 2 shows an eNB 2 as an example for second apparatus, which may serve a target cell, such as Cell 3 shown in FIG. 1. Moreover, FIG. 2 shows a network manager NM 3 as an example for a third apparatus. A connection between the eNBs 1 and 2 is provided via an X2 interface, and a connection between the eNBs 1 and 2 with the NM 3 is provided between an N interface.

Figure 3:
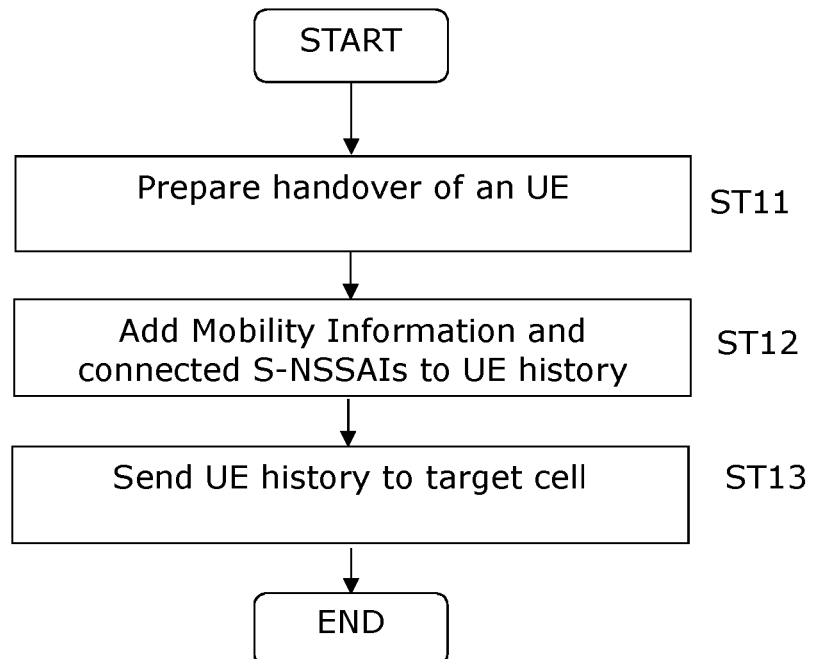
FIG. 3 shows a flowchart of a procedure carried out by cells or eNBs according to an embodiment.
Figure 4:
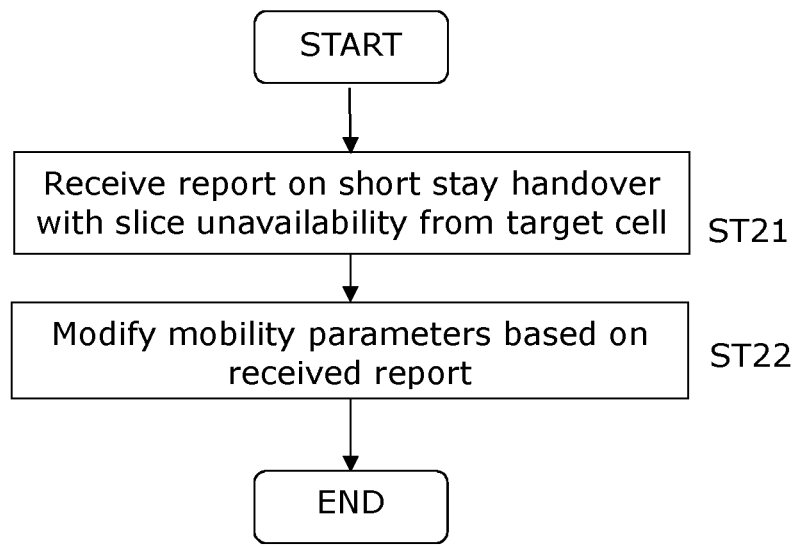
FIG. 4 shows a flowchart of a procedure carried out by a source cell according to an embodiment.
Figure 5:
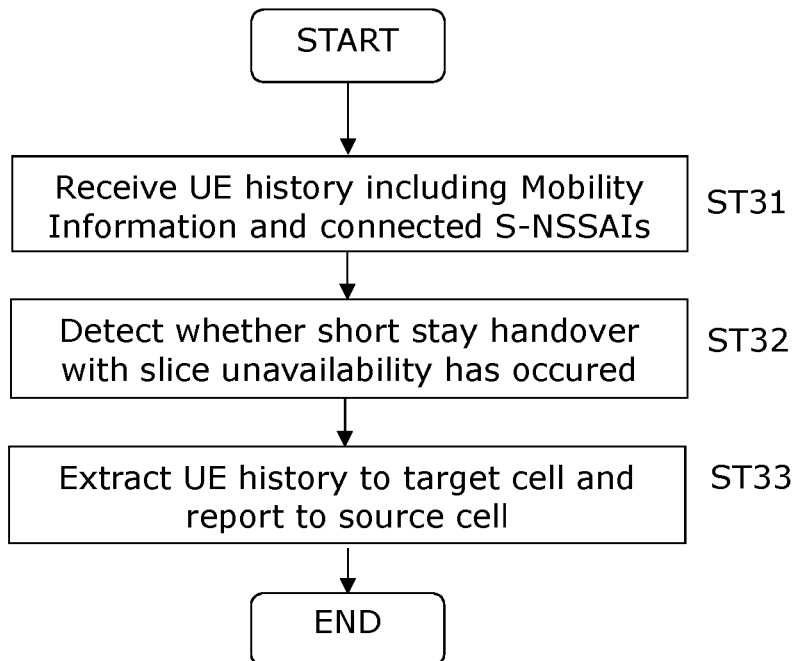
FIG. 5 shows a flowchart of a procedure carried out by a target cell according to an embodiment.
Figure 6:
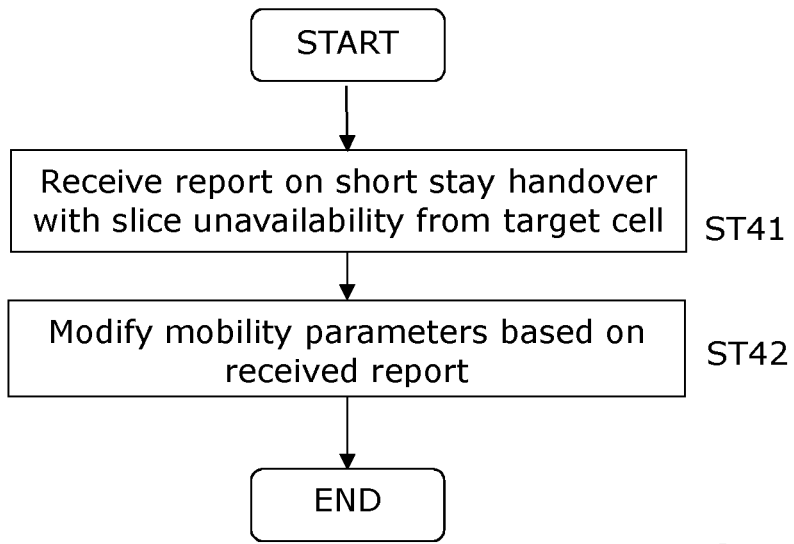
FIG. 6 shows a flowchart of a procedure carried out by an NM according to an embodiment.

FIG. 3 illustrates a process carried out by the eNB 1, FIG. 4 illustrates a process carried out by the eNB 2, and FIG. 6 illustrates a process carried out by the NM 3 in connection of handover of a terminal device such as a user equipment (UE).

The eNB 1 comprises at least one processor 11 and at least one memory 12 including computer program code. The at least one processor 11, with the at least one memory 12 and the computer program code, is configured to cause the apparatus to perform: preparing a handover of a terminal device (as shown in ST 11 in FIG. 3), adding mobility information and at least one connected slice network slice identifier identifying at least one network slice used by the terminal device to a terminal device history of the terminal device during the handover preparation (as shown in ST 12 in FIG. 3), and sending the terminal device history to a target cell (e.g., eNB 2 in FIG. 2 or Cell 2 or Cell 3 in FIG. 1) for the handover of the terminal device (as shown in ST 13 of FIG. 3).

The above process may be carried out by each cell (eNB) upon preparing a handover. Thus, mobility information and connected slice network slice identifiers (S-NSSAIs) are added to terminal device history (e.g., UE history), which can help to determine after a short stay handover with slice unavailability whether and how such a situation can be avoided in the future.

The short stay handover with slice unavailability is a handover from a source cell (Cell 1) to a final target cell (Cell 3) via at least one first target cell (Cell 2) which does not support at least one network slice used by the terminal device.

When a short stay handover with slice unavailability has occurred, the eNB 1 (the source cell) may carry out the procedure shown in FIG. 4. In particular, in ST 21, the report on a short stay handover with slice unavailability is received from a target cell (e.g., eNB 2 or Cell 3) involved in the handover of the terminal device, wherein the report includes the UE history comprising the mobility information and connected slice network slice identifiers (S-NSSAIs). In ST 22, the eNB 1 modifies mobility parameters based on the received report in order avoid a short stay handover with an interruption of the network slice.

The eNB 2 (as an example for a target cell) comprises at least one processor 21 and at least one memory 22 including computer program code. The at least one processor 21, with the at least one memory 22 and the computer program code, is configured to cause the apparatus to perform: receiving a terminal device history (UE history) from a source cell (e.g. eNB 1 or Cell 1) of a handover of a terminal device, the terminal device history including mobility information and connected slice network slice identifier of the terminal device (as shown in ST 31 of FIG. 5), detecting whether a short stay handover with slice unavailability has occurred (as shown in ST 32 of FIG. 5), and, when short stay handover with slice unavailability has occurred, extracting the terminal device history of the terminal device and reporting the short stay handover to the source cell (as shown in ST 33 of FIG. 5).

When short stay handover with slice unavailability has occurred, a corresponding report may be sent to a network control element such as the network manager (NM) 3 shown in FIG. 2.

The NM 3 comprises at least one processor 31 and at least one memory 32 including computer program code. The at least one processor 31, with the at least one memory 32 and the computer program code, is configured to cause the apparatus to perform: receiving a report on a short stay handover with slice unavailability including a terminal device history (UE history) from a cell (e.g., eNB 1 or 2 of FIG. 2 or Cell 1 or Cell 3 of FIG. 1) involved in a short stay handover with slice unavailability of the terminal device (as shown in ST 41 of FIG. 6), and adjusting mobility parameters of the source cell according to the received terminal device history (as shown in ST 42 of FIG. 6).

It is noted that the eNBs 1 and 2 and the NM (or the corresponding apparatuses) may further comprise input/output (I/O) units or functions 13, 23, 33 connected to the processor 11, 21, 31 in order to provide connections to other elements.

In the following, some embodiments are described in more detail.

According to some embodiments, a method for proper detection of "short stay HO with slice un-availability" and the means to communicate the detected problem to the original source cell for its rectification by re-configuration of the network parameters are provided. Some embodiments comprise the following aspects:

1) Each serving cell adds Mobility Information as well as the connected Network Slice identifiers (S-NSSAIs) to existing UE history and send it to the target cell during HO preparation.

2) Target cell that detects the short stay HO with slice unavailability (Cell 3 in above scenario described in connection with FIG. 1) extracts the relevant UE history (from Cell 3, Cell 2 and Cell 1).

3) Target cell that detects the short stay HO with slice unavailability reports the short stay HO to the original source cell (Cell 1), e.g. using the X2/S1 message "Handover Report", a. With a new, appropriate root cause, e.g. "short stay HO with slice unavailability"

b. and including the extracted UE History, which may contain the Mobility Information, list of connected S-NSSAIs and the cell coverage quality measurements.

4) The original source cell (Cell 1) modifies its mobility parameters to avoid those short stay HOs with slice interruptions.

5) Either Cell 1 or Cell 3 also report those "short stay HO with slice unavailability" to the Network Manager (NM), for example, via Interface-N.

6) The NM or centralized SON (cSON) solutions include these "short stay HO with slice unavailability" statistics to mobility parameter optimization and adjust the Cell 1 mobility parameters accordingly. Additionally, cSON algorithms may also optimize the coverage of Cell 1 and Cell 3 and also Cell 2 to allow smoother HOs between them.

7) To further help the parameter re-configuration by the original source cell (Cell 1), the source cell may also request the first target cell to let the incoming UE measure and report the source cell to the first target cell for a limited period of time.

8) In addition, the source cell may also provide a list of additional neighboring cells (e.g. Cell 3) to be measured and reported by the UE.

9) The source cell may choose the list of additional neighboring cells depending on the slices supported by those neighboring cells as well as their measurements as reported by the UE to the original source cell.

10) The source cell may also provide specific threshold values to compare the UE measurements and the target cell needs to send the UE measurements in HO report only if the UE measurements for the source cell or the other neighboring cells cross those thresholds.

11) The source cell may also provide a value for the timer during which the UE should make the above measurements and report to the target cell.

12) The target cell which detects the short stay may derive some information from the reported measurements and includes this information into the short stay report.

13) The target cell may decide to send the short stay report only if the reported measurements fulfill certain conditions, and may decide not to send it at all, if the conditions are not fulfilled.

In the following, some more detailed implementations of embodiments are described. In particular, embodiments can be implemented in both distributed and centralized manner. Some example implementation options are described below.

Distributed Implementation:

For distributed implementation, information elements for different messages on Xn interface (between two gNBs) needs to be modified/added. In the following the relevant X2 messages are taken from 3GPP TS 36.423 as a baseline, wherein the additions/modifications (highlighted by underlining) needed to implement the invention are indicated. The corresponding messages on Xn interface may easily be correspondingly defined, so that the X2 messages shown in the following may be taken as baseline.

As shown below, in table "9.2.38 UE History Information", the entry "Las Visited Cell Information" is modified, wherein IE type and reference is defined in table 9.2.39. In this table "9.2.39 Last Visited Cell Information" new item "NR Cell" and "Last Visited NR Cell Information" is added, wherein IE type and reference is defined in table 9.2.XX. In table "9.2.XX Last Visited NR Cell Information", the new items Mobility Information and Connected Slice List are added. The Mobility Information may be in a form of a bit string (size (32)), and describes information related to the handover; the source eNB provides it in order to enable later analysis of the conditions that led to a wrong HO. The Connected Slice List lists Connected S-NSSAIs in serving cell at HO. In particular, the Connected Slice List is an IE which indicates the list of slices the UE was connected to in the serving cell just before the handover. For the entries, a range between 1 and a predefined value <maxnoofSliceItems> may be defined. This value maxnoofSliceItems is the maximum number of signalled slice support items.

Moreover, in table "9.1.19 Handover Report", a new entry for the Handover Report Type may be added, namely "short stay with slice unavailability". Moreover, also Mobility information and UE History Information are included in the Handover Report.

9.2.38 UE History Information

| IE/Group Name | Presence | Range | IE type and reference | Semantics description | Criticality | Assigned Criticality |
|---|---|---|---|---|---|---|
| Last Visited Cell List | | 1 . . . <maxnoofCells> | | Most recent information is added to the top of this list | — | — |
| >Last Visited Cell Information | M | | 9.2.39 | | — | — |

9.2.39 Last Visited Cell Information

| IE/Group Name | Presence | Range | IE type and reference | Semantics description | Criticality | Assigned Criticality |
|---|---|---|---|---|---|---|
| CHOICE Last Visited Cell Information | M | | | | — | — |
| >E-UTRAN Cell | | | | | — | — |

-continued

| IE/Group Name | Presence | Range | IE type and reference | Semantics description | Criticality | Assigned Criticality |
|---|---|---|---|---|---|---|
| >>Last Visited E-UTRAN Cell Information | M | | 9.2.40 | | — | — |
| >UTRAN Cell | | | | | — | — |
| >>Last Visited UTRAN Cell Information | M | | OCTET STRING | Defined in TS 25.413 [24] | — | — |
| >GERAN Cell | | | | | — | — |
| >>Last Visited GERAN Cell Information | M | | 9.2.41 | | — | — |
| >NR Cell | | | | | — | — |
| >>Last Visited NR Cell Information | M | | 9.2.XX | | — | — |

9.2.XX Last Visited NR Cell Information

| IE/Group Name | Presence | Range | IE type and reference | Semantics description | Criticality | Assigned Criticality |
|---|---|---|---|---|---|---|
| Global Cell ID | M | | ECGI 9.2.14 | | — | — |
| Cell Type | M | | 9.2.42 | | — | — |
| Time UE stayed in Cell | M | | INTEGER (0 . . . 4095) | The duration of the time the UE stayed in the cell in seconds. If the UE stays in a cell more than 4095 s, this IE is set to 4095. | — | — |
| Time UE stayed in Cell Enhanced Granularity | O | | INTEGER (0 . . . 40950) | The duration of the time the UE stayed in the cell in 1/10 seconds. If the UE stays in a cell more than 4095 s, this IE is set to 40950. | YES | ignore |
| HO Cause Value | O | | Cause 9.2.6 | The cause for the handover from the E-UTRAN cell. | YES | Ignore |
| Mobility Information | O | | BIT STRING (SIZE (32)) | Information related to the handover; the source eNB provides it in order to enable later analysis of the conditions that led to a wrong HO. | YES | ignore |
| Connected Slice List | O | | Connected Slice List | Connected S-NSSAIs in serving cell at HO | | |

Connected Slice List:
This IE indicates the list of slices the UE was connected to in the serving cell just before the handover

| IE/Group Name | Presence | Range | IE type and reference | Semantics description | Criticality | Assigned Criticality |
|---|---|---|---|---|---|---|
| Slice Support Item IEs | | 1 . . . <maxnoofSliceItems> | | | — | |
| >S-NSSAI | M | | x.x.x.x | | — | |

| Range bound | Explanation |
|---|---|
| maxnoofSliceItems | Maximum no. of signalled slice support items. Value is FFS. |

9.1.2.19 Handover Report

This message is sent by the eNB$_1$ to report a handover failure event or other critical mobility problem.

Direction: eNB$_1$→eNB$_2$.

essary.ShortStayWithSliceUnavailability. This indicates the number of unnecessary short stay handovers (Cell 1→Cell 2→Cell 3), where the middle cell did not support some or all of the slices to which the UE was connected in Cell 1.

| IE/Group Name | Presence | Range | IE type and reference | Semantics description | Criticality | Assigned Criticality |
|---|---|---|---|---|---|---|
| Message Type | M | | 9.2.13 | | YES | Ignore |
| Handover Report Type | M | | ENUMERATED (HO too early, HO to wrong cell, . . . , InterRAT ping-pong, <u>short stay with slice-unavailability</u>) | | YES | Ignore |
| Handover Cause | M | | Cause 9.2.6 | Indicates handover cause employed for handover from eNB$_2$ | YES | Ignore |
| Source cell ECGI | M | | ECGI 9.2.14 | ECGI of source cell for handover procedure (in eNB$_2$) | YES | Ignore |
| Failure cell ECGI | M | | ECGI 9.2.14 | ECGI of target cell for handover procedure (in eNB1) | YES | Ignore |
| Re-establishment cell ECGI | C-ifHandoverReportType HoToWrongCell | | ECGI 9.2.14 | ECGI of cell where UE attempted re-establishment | YES | Ignore |
| Target cell in UTRAN | C-ifHandoverReportType InterRATpingpong | | OCTET STRING | Encoded according to UTRAN Cell ID in the Last Visited UTRAN Cell Information IE, as defined in in TS 25.413 [24] | YES | Ignore |
| Source cell C-RNTI | O | | BIT STRING (SIZE (16)) | C-RNTI allocated at the source eNB (in eNB$_2$) contained in the AS-config (TS 36.331 [9]). | YES | Ignore |
| <u>Mobility Information</u> | <u>O</u> | | <u>BIT STRING (SIZE (32))</u> | <u>Information provided in the HANDOVER REQUEST message from eNB$_2$.</u> | YES | Ignore |
| UE RLF Report Container | O | | OCTET STRING | The UE RLF Report Container IE received in the RLF INDICATION message. | YES | Ignore |
| UE RLF Report Container for extended bands | O | | OCTET STRING | The UE RLF Report Container for extended bands IE received in the RLF INDICATION message. | YES | Ignore |
| <u>UE History Information</u> | | | | | | |

| Condition | Explanation |
|---|---|
| ifHandoverReportType HoToWrongCell | This IE shall be present if the Handover Report Type IE is set to the value "HO to wrong cell" |
| ifHandoverReportType InterRATpingpong | This IE shall be present if the Handover Report Type IE is set to the value "InterRAT ping-pong" |

For centralized implementation a new measurement report needs to be defined on Interface-N between the Element Manager and Network Manager. For example, by updating the MRO related measurements in the 3GPP TS 32.425 Performance Measurements E-UTRAN, as shown in the following. That is, an additional measurement item may be added, for example, which could be termed HO.Unnec- In the following, chapter 4.3.1.33 "Number of handover failures related with MRO" including the additional item mentioned above is listed:

4.3.1.3.3 Number of Handover Failures Related with MRO a) This measurement provides the number of outgoing handover related events that fail related with MRO. Handover related events include normal successful handovers and all failure events by which a UE in RRC connected state changes its serving cell without following a normal handover. Different MRO failure cases are found in TS 36.300 [12]. The measurement includes separate counters for the number of handover failures classified as "too early", "too late" and "to wrong cell". The measurement for the too late handover is split to subcounters indicating the threshold of the serving cell itself was not crossed and the threshold of the neighbour cell was not crossed in UE measurements before handover in case the handover is triggered by more than one threshold of the measurement report triggering events, the subcounters are only needed if more than one threshold of the measurement report triggering events is used and using single or multiple thresholds is vendor specific.

b) CC c) The measurements of too early handovers, too late handovers and to wrong cell handovers are obtained respectively by accumulating the number of failure events related to handover which are identified by the eNB according to the definitions in TS 36.300 [12].

Besides being added to the measurement of total too late handovers, each too late handover (identified by the eNB according to the definitions in TS 36.300 [12]) is also added to the relevant subcounter indicating the threshold of the serving cell itself configured in the measurement report triggering events (see 36.331 [18]) was not crossed or the threshold of the neighbour cell configured in the measurement report triggering events was not crossed if more than one threshold triggering a measurement report is configured to the UEs for the involved neighbour relation and the following UE measurement results are available for both cells involved in the too late handover rsrpResult of "measResultLastServCell" and
rsrpResult of the subject neighbour cell in "measResultNeighCells"

in a) the "RLF report" IE in the received RRC message "UEInformationResponse" (see 36.331 [18]), in case both cells involved in the too late handover belong to the same eNB, or b) the "UE RLF Report Container" IE in the received X2 message "RLF Indication", in case the cells involved in the too late handover belong to different eNBs.

The uncrossed threshold (of the serving itself and the neighbour) is identified by comparing the UE measurement results above with the configured thresholds (adding the corresponding hysteresis, see 36.331 [18]) of the measurement report triggering events, if the threshold of the serving cell itself was not crossed, the observed too late handover is then added to the subcounter (HO.OutFail.TooLateOwnNotCrossed) indicating the threshold of the serving cell was not crossed if the threshold of the neighbor cell itself was not crossed, the observed too late handover is then added to the subcounter (HO.OutFail.TooLateNeighborNotCrossed) indicating the threshold of the neighbour cell was not crossed if the thresholds of both the serving cell itself and the neighbour cell were not crossed, then this too late handover is added to both subcounters (HO.OutFail.TooLateOwnNotCrossed and HO.OutFail.TooLateNeighborNotCrossed) indicating the threshold of serving cell itself was not crossed and the threshold of the neighbour cell was not crossed if no threshold was not crossed, then this handover is only added to the measurement of total too late handovers but not to the subcounter indicating the threshold of the serving cell itself was not crossed or the threshold of the neighbour cell was not crossed.

If only one threshold triggering the measurement report is configured to the UEs for the involved neighbour relation or the UE measurements above are not available, the observed too late handover is only added to the measurement of total too late handovers but not to the subcounter indicating the threshold of the serving cell itself was not crossed or the threshold of the neighbour cell was not crossed.

d) Each measurement is an integer value.

e) The measurements are named

HO.OutFail.TooEarly
HO.OutFail.TooLate

Which indicates the total number of too late handovers identified by the eNB according to the definitions in TS 36.300 [12].

HO.OutFail.TooLateOwnNotCrossed

Which indicates the number of too late handovers for which the threshold of the serving cell itself was not crossed.

HO.OutFail.TooLateNeighborNotCrossed

Which indicates the number of too late handovers for which the threshold of the neighbor cell was not crossed.

HO.OutFail.ToWrongCell

Which indicates the number of "handover to wrong cell" cases on the NR (NR A→B in Annex A.13) towards the target cell (see 36.300 [12]). It is up to the eNodeB to decide whether or not the HO parameters of this NR are problematic in the "handover to wrong cell" case.

HO.OutFail.HwcReestablish

Which indicates the number of "handover to wrong cell" cases on the NR (NR A→C in Annex A.13) towards the cell with which the UE attempts to re-establish the radio link connection (see 36.300 [12]). It is up to the eNodeB to decide whether or not the HO parameters of this NR are problematic in the "handover to wrong cell" case.

HO.Unnecessary.ShortStayWithSliceUnavailability

Which indicates the number of unnecessary short stay handovers (Cell A→Cell B→Cell C), where the middle cell did not support some or all of the slices to which the UE was connected in Cell A.

f) EUtranRelation g) Valid for packet switched traffic h) EPS

In the following, measurement support is described. Assume a 1-2-3 short stay event, as described above in connection with FIG. 1, where Cell 1 and Cell 3 support the slice and Cell 2 does not. The source Cell 1 may request Cell 2 to measure and report the source Cell 1, and potentially further cells supporting the slice in the neighborhood, e.g. Cell 3.

These measurements during the short stay in Cell 2 would indicate, whether the UE could have stayed longer in Cell 1, and could have done the (earlier) handover directly to Cell 3. This would give further clarification whether the short stay in Cell 2 really could have been avoided. Note that the pure fact that the UE has stayed only e.g. 1 sec in Cell 2 is a good indication for a short stay, but it does not finally clarify that it could have been avoided. Measurements would provide more confidence.

The measurements can be considered in 3 different ways:

1. The short stay report (e.g. Handover Report) is not sent at all, if the measurements indicate that the direct handover could not have been possible (e.g. when both Cell 1 and Cell 3 measurements have been below a threshold)

2. The short stay report contains the information, whether direct handover would have been possible (e.g. during the whole short stay, either Cell 1 or Cell 3 have been above the threshold)

3. The short stay report contains a log of the measurements.

Hence, embodiments invention allow detection of short stay HOs as well as any service interruption faced during those short stays in the middle cell. This would be crucial in network slicing deployments where some of the slices are only supported in a limited area and the initial planning leads to some undesired HO behavior due to the actual radio propagation conditions.

With this information, the existing MRO framework can be simply extended by a slice-aware optimization. In the following, it is described how this may look like:

Typically, a connection failure is still considered worse than such a "short stay with slice-unavailability". Therefore, it will be advantageous to introduce a weight factor which indicates the priority of this event. This has already been applied for the classical ping-pongs. For instances, a weight of 25% would indicate, that such an 1-2-3 event (short stay with slice-unavailability in 2, source cell 1 and final target have the slice available) would be counted as 0.25 failures.

Choosing this weight to be <<100% would practically imply, that this optimization is done only when failures have been fixed. In other words, cell 1 would postpone the 1-2 handover (or "pre-pone" the 1-3 handover) only if there are no too late failures on boundary 1-2 (or no too early failures from 1-3).

Additionally, centralized Coverage and Capacity Optimization (CCO) may also benefit from this information and may try to optimize the coverage, for example of Cell 1/Cell 3, to better align the Slice support in different cells to the actual movement of the UEs connected to those Slices.

Summarizing, some embodiments provide the following steps:

Each serving cell adds Mobility Information and the connected Network Slice identifiers (S-NSSAIs) to existing UE history and send it to the target cell during HO preparation.

A target cell that detects the short stay HO extracts the relevant UE history and reports the short stay HO to the original source cell with a new, appropriate root cause.

The original source cell modifies its mobility parameters to avoid those short stay HOs with slice interruptions.

In this way, it is possible to combine the available knowledge of the cells involved in a short stay HO (Cell 1, Cell 2 and Cell 3 of FIG. 1), to detect a short stay handover due to slice-unavailability, and to modify the mobility parameters accordingly to reduce the probability of further short stay HOs.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22, 32 and executable by the processor (processing resources, processing circuitry) 11, 21, 31 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22, 32 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21, 31 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
   at least one processor; and
   at least one memory including computer program code, the at least one memory and the computer program code configured to, with the at least one processor, cause the apparatus at least to perform:
     preparing a handover of a terminal device in a source cell,
     adding mobility information and at least one connected slice network slice identifier identifying at least one network slice used by the terminal device to a terminal device history of the terminal device during the handover preparation, and
     sending the terminal device history to a target cell for the handover of the terminal device,
     receiving a report on a short stay handover with slice unavailability from a target cell involved in the handover of the terminal device, the short stay handover being a handover from the source cell to a final target cell via at least one first target cell which does not support at least one network slice used by the terminal device, and modifying mobility parameters based on the received report in order avoid a short stay handover with an interruption of the network slice.

2. The apparatus according to claim 1, wherein the at least one memory and the computer program code are configured to, with the at least one processor, cause the apparatus to further perform:

requesting the first target cell or the final target cell to provide measurements of the terminal device.

3. The apparatus according to claim 2, wherein the at least one memory and the computer program code are configured to, with the at least one processor, cause the apparatus to further perform:

requesting the first target cell to instruct the terminal device to measure and report the source cell to the first target cell for a limited period of time.

4. The apparatus according to claim 3, wherein the at least one memory and the computer program code are configured to, with the at least one processor, cause the apparatus to further perform:

providing a list of additional cells to be measured and reported by the terminal device, or providing specific threshold values to compare the terminal device measurements and instructing target cell to send the terminal device measurements only if the terminal device measurements for the source cell or the other neighboring cells cross those thresholds, or specifying a time period during which the terminal device should make the measurements and report to the target cell.

5. The apparatus according to claim 1, wherein the at least one memory and the computer program code are configured to, with the at least one processor, cause the apparatus to further perform:

sending the report to a network control element.

6. An apparatus, comprising:

at least one processor; and at least one memory including computer program code, the at least one memory and the computer program code configured to, with the at least one processor, cause the apparatus at least to perform:

receiving a terminal device history from a source cell of a handover of a terminal device, the terminal device history including mobility information and at least one connected slice network slice identifier identifying at least one network slice used by the terminal device of the terminal device, detecting whether a short stay handover with slice unavailability has occurred, the short stay handover with slice unavailability being a handover from a source cell to a final target cell via at least one first target cell which does not support at least one network slice used by the terminal device, and when short stay handover with slice unavailability has occurred, extracting the terminal device history of the terminal device and reporting the short stay handover to the source cell.

7. The apparatus according to claim 6, wherein the at least one memory and the computer program code are configured to, with the at least one processor, cause the apparatus to further perform:

including the extracted terminal device history into the report.

8. The apparatus according to claim 7, wherein the extracted terminal device history includes mobility information, list of connected single network slice selection assisted information or cell coverage quality measurements.

9. The apparatus according to claim 6, wherein the at least one memory and the computer program code are configured to, with the at least one processor, cause the apparatus to further perform:

including information from measurements received from the terminal device into the report.

10. The apparatus according to claim 9, wherein the at least one memory and the computer program code are configured to, with the at least one processor, cause the apparatus to further perform:

including the information from measurements received from the terminal device into the report only when certain conditions are fulfilled.

11. The apparatus according to claim 6, wherein the at least one memory and the computer program code are configured to, with the at least one processor, cause the apparatus to further perform:

sending the report to a network control element.

12. An apparatus, comprising:

at least one processor; and at least one memory including computer program code, the at least one memory and the computer program code configured to, with the at least one processor, cause the apparatus at least to perform:

receiving a report on a short stay handover with slice unavailability including a terminal device history from a cell involved in a short stay handover with slice unavailability of the terminal device, wherein the short stay handover with slice unavailability is a handover from a source cell to a final target cell via at least one first target cell which does not support at least one network slice used by the terminal device, and the terminal device history includes mobility information and at least one connected slice network slice identifier identifying at least one network slice used by the terminal device, and adjusting mobility parameters of the source cell according to the received terminal device history.

13. The apparatus according to claim 12, wherein the at least one memory and the computer program code are configured to, with the at least one processor, cause the apparatus to further perform:

optimizing coverage of any of the involved cells.

* * * * *